(12) United States Patent
Abukawa et al.

(10) Patent No.: US 6,335,582 B1
(45) Date of Patent: *Jan. 1, 2002

(54) PERMANENT-MAGNET REVOLVING ELECTRODYNAMIC MACHINE WITH A CONCENTRATED WINDING STATOR

(75) Inventors: Toshimi Abukawa, Ohta; Kazuo Ohnishi, Kasukabe; Hideaki Suzuki, Chiba; Hitoshi Ishii, Gunma-ken; Keiichi Abe, Kiryu, all of (JP)

(73) Assignee: Japan Servo Co., LTD, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,107

(22) Filed: Apr. 15, 1998

(30) Foreign Application Priority Data

Apr. 16, 1997 (JP) .............................. 9-113595

(51) Int. Cl.⁷ .......................... H02K 21/12; H02K 3/48; H02K 1/00; H02K 1/12
(52) U.S. Cl. ....................... 310/214; 310/216; 310/259; 310/156.38
(58) Field of Search ................................ 310/214, 187, 310/179, 184, 185, 188, 189, 198, 180, 200, 216, 254, 259, 258, 261; 428/544; 335/220, 281, 297; 336/210–213, 216–219, 233

(56) References Cited

U.S. PATENT DOCUMENTS 871,758 A * 11/1907 Heitmann et al. .......... 310/214
1,045,159 A * 11/1912 Lundell ....................... 310/259

(List continued on next page.)

OTHER PUBLICATIONS

Patent Abstracts of Japan, AN 08–154763, May 28, 1996, JP 9–322455, Dec. 12, 1997.
Patent Abstracts of Japan, AN 08–292657, Nov. 5, 1996, JP 10–146030, May 29, 1998.
Patent Abstracts of Japan, AN 06–072956, Mar. 18, 1994, JP 7–264822, Oct. 13, 1995.
Fitzgerald et al., Electric Machinery, Fourth Edition, McGraw–Hill Book Company, p. 152, 1983.*

* cited by examiner

*Primary Examiner*—Nestor Ramirez
*Assistant Examiner*—Dang Dinh Le
(74) *Attorney, Agent, or Firm*—Oblon, Spivak, McClelland, Maier & Neustadt, P.C.

(57) ABSTRACT

A permanent-magnet electric rotating machine with a concentrated winding stator, including a stator having a plurality of stator magnetic poles formed so as to extend radially from an annular yoke portion of a stator iron core, and windings mounted on the stator magnetic poles; and a rotor having a permanent magnet with a plurality of magnetic poles and rotatably held so as to face the stator through an air gap; wherein each of the stator magnetic poles has a straight shape having a width which is made constant over a whole length, small grooves are formed in each of the stator magnetic poles in symmetrical positions on opposite sides and near a top end portion of the stator magnetic pole, a bottom portion of each slot portion defined by adjacent ones of the stator magnetic poles and the yoke is formed triangularly, each of the stator winding is constituted so that a winding having a predetermined number of turns and winding being formed so as to be fittable to each of the stator magnetic poles is mounted on the stator magnetic pole through an insulator, and wedges are fitted to the small grooves formed in the stator magnetic poles.

8 Claims, 10 Drawing Sheets

U.S. PATENT DOCUMENTS

| | | | | |
|---|---|---|---|---|
| 1,375,699 A | * | 4/1921 | Ilg | 310/214 |
| 2,386,673 A | * | 10/1945 | Fisher | 310/214 |
| 3,158,770 A | * | 11/1964 | Coggeshall et al. | 310/214 |
| 3,270,264 A | * | 8/1966 | Miner | 318/223 |
| 3,281,655 A | * | 10/1966 | Blasinggame | 323/51 |
| 3,334,252 A | * | 8/1967 | Gayral | 310/214 |
| 3,489,938 A | * | 1/1970 | Nakamura | 310/214 |
| 3,594,597 A | * | 7/1971 | Kildishev et al. | 310/214 |
| 4,060,746 A | * | 11/1977 | Heyraud | 310/177 |
| 4,160,926 A | * | 7/1979 | Cope et al. | 310/215 |
| 4,346,773 A | * | 8/1982 | Hofbauer et al. | 180/165 |
| 4,425,521 A | * | 1/1984 | Rosenberry, Jr. et al. | 310/214 |
| 4,720,649 A | * | 1/1988 | Habermann et al. | 310/90.5 |
| 4,774,424 A | * | 9/1988 | Habermann | 310/90.5 |
| 4,774,428 A | | 9/1988 | Konecny | 310/198 |
| 5,006,745 A | * | 4/1991 | Nishio et al. | 310/177 |
| 5,164,622 A | * | 11/1992 | Kordik | 310/67 R |
| 5,214,839 A | * | 6/1993 | Rieber et al. | 29/596 |
| 5,252,877 A | * | 10/1993 | Sawa et al. | 310/214 |
| 5,258,681 A | * | 11/1993 | Hibino et al. | 310/214 |
| 5,260,620 A | * | 11/1993 | Morrill | 310/185 |
| 5,583,387 A | * | 12/1996 | Takeuchi et al. | 310/217 |
| 5,598,049 A | * | 1/1997 | Meier | 310/214 |
| 5,763,976 A | * | 6/1998 | Huard | 310/168 |
| 5,936,322 A | * | 8/1999 | Yamaguchi et al. | 310/156 |
| 6,034,460 A | * | 3/2000 | Tajima et al. | 310/179 |
| 6,133,662 A | * | 10/2000 | Matsunobu et al. | 310/156 |
| 6,239,525 B1 | * | 5/2001 | Matsunobu et al. | 310/156 |

FIG. 5

TABLE 1

| THE NUMBER OF STATOR MAGNETIC POLES M | THE NUMBER OF PERMANENT-MAGNET MAGNETIC POLES P | WINDING FACTOR K |
|---|---|---|
| 12 | 8 | 0.866 |
|  | * 10 | 0.933 |
|  | * 14 | 0.933 |
|  | 16 | 0.866 |
| 18 | 12 | 0.866 |
|  | # 14 | 0.883 |
|  | * 16 | 0.970 |
|  | * 20 | 0.970 |
|  | # 22 | 0.883 |
|  | 24 | 0.866 |
| 24 | 16 | 0.866 |
|  | * 20 | 0.933 |
|  | * 22 | 0.983 |
|  | * 26 | 0.983 |
|  | * 28 | 0.933 |
|  | 32 | 0.866 |

FIG. 17

TABLE 2

| CASE | MOTOR WINDINGS | | GENERATOR WINDINGS | |
|---|---|---|---|---|
| COMBINATION OF CONNECTION DIAGRAMS | WIRE DIAMETER | THE NUMBER OF TURNS (TURNS) | WIRE DIAMETER | THE NUMBER OF TURNS (TURNS) |
| FIG. 9 MOTOR WINDINGS | ○ (φD1) | ○ (N1 × 2)<br>● (N1 + 0.9N1) | | |
| FIG. 9 AND FIG. 10 MOTOR OR WINDINGS OR GENERATOR WINDINGS | ○ (φD1) | ○ (N1 × 2)<br>● (N1 + 0.9N1) | ○ (φD2) | ○ (1.6N1 × 2)<br>● (1.6N1 + 1.5N1) |
| FIG. 11 MOTOR OR GENERATOR WINDINGS : SERIES CONNECTION | ○ (φD1) | ○ (0.5N1 × 4)<br>● (0.8N1 × 2 + 0.2N1 × 2) | ○ (φD2) | ○ (0.8N1 × 4)<br>● (1.2N1 × 2 + 0.4N1 × 2) |
| FIG. 12 MOTOR WINDINGS : PARALLEL CONNECTION | ○ (φD2) | ○ (2N1 × 2) | ○ (φD3) | ○ (3.2N1 × 2) |
| FIG. 12 AND FIG. 13 MOTOR OF GENERATOR WINDINGS : PARALLEL CONNECTION | ○ (φD2) | ○ (2N1 × 2) | ○ (φD3) | ○ (3.2N1 × 2) |
| FIG. 14 MOTOR OR GENERATOR WINDINGS : PARALLEL CONNECTION OF SERIES CONNECTION | ○ (φD2) | ○ (N1 × 4)<br>● (1.6N1 × 2 + 0.4N1 × 2) | ○ (φD3) | ○ (1.6N1 × 4)<br>● (2N1 × 2 + 1.2N1 × 2) |

NOTE
Each set of windings are constituted by 2 or 4 winding units connected in series or parallel.

Wire diameter:
The mark ○ represents the case where the above-mentioned 2 or 4 winding units are equal in diameter to each other, while the mark ● represents the case where the above-mentioned 2 or 4 winding units are different in diameter from each other.

The number of turns:
The mark ○ represents the case where the above-mentioned 2 or 4 winding units are equal in the number of turns to each other, while the mark ● represents the case where the above-mentioned 2 or 4 winding units are different in the number of turns from each other.
In the parentheses ( ), N1 represents a predetermined number of turns, the mark × represents the number of windings, and the mark + represents a combination of different wire-diameter windings. For example, (N1×4) represents the case where 4 winding units each having the number of turns of N1 are used, and (1.6N1×2+1.2N1×2) represents the case where 2 winding units each having the number of turns of 1.6N1 and 2 winding units each having the number of turns of 1.2N1 are used in combination.

PERMANENT-MAGNET REVOLVING ELECTRODYNAMIC MACHINE WITH A CONCENTRATED WINDING STATOR

BACKGROUND OF THE INVENTION

1. Field of the Invention

The present invention relates to a permanent-magnet electric rotating machine, and particularly relates to a permanent-magnet electric rotating machine with a concentrated winding stator suitable to windings with thick wire.

2. Description of the Related Art

A large current of a low voltage is fed to an electric rotating machine using a battery or the like as power source. Therefore, thick wire windings are used as a stator windings wound on stator magnetic poles of such an electric rotating machine in order to reduce the resistance value of the windings.

A stator used in a conventional electric rotating machine of such a type will be described with reference to FIG. 19.

FIG. 19 is a cross-sectional view of a stator 84 of a conventional electric rotating machine, viewed in its axial direction. Twelve stator magnetic poles 85a1 to 85a12 are formed at circumferentially equal intervals so as to radially extend from a yoke 86 toward the center of the stator. In addition, the stator magnetic poles 85a1 to 85a12 have circumferentially widened top end portions 85b1 to 85b12 respectively. The reference numeral W0 designates a slit width between adjacent stator magnetic poles, for example, 85a1 and 85a2, and so on. A bottom portion 87a of each slot 87 formed between adjacent stator magnetic poles is shaped to be an arc.

Generally, a permanent-magnet electric rotating machine has stator magnetic poles, and, conventionally, in such a permanent-magnet electric rotating machine, stator windings are concentratedly mounted on the magnetic poles. In such a conventional permanent-magnet electric rotating machine, it is general that the ratio of the number M of the magnetic poles of the stator to the number P of the magnetic poles of the permanent magnet is set to 3:2, that is M:P=3:2. Further, a motor winding and a generator winding are wound in one and the same slot.

In such a conventional electric rotating machine with a concentrated winding stator, however, there have been some problems as follows.

(1) In the stator of such a conventional electric rotating machine, the top end portions of the stator magnetic poles are circumferentially widen as shown in FIG. 19. Accordingly, the slit width between adjacent stator magnetic poles is narrow. When thick-wire windings are to be wound on the respective stator magnetic poles by use of a nozzle of a winding machine, the width of the nozzle is limited because the slit width passed by the nozzle is narrow, so that it has been impossible to mount such thick-wire windings.

(2) In addition, if a windings in which thick wire is wound on a bobbin in advance is to be used, the slit width is too narrow to mount onto a stator magnetic pole from the radial center side of the stator.

(3) Further, because the bottom portion of each slot is shaped to be an arc, the slot area is small, and the total number of turns of the windings is limited.

(4) Moreover, because the ratio of the number M of the magnetic poles of the stator to the number P of the magnetic poles of the permanent magnet is set to M:P=3:2, cogging torque is large, and the winding factor expressing the effective utilization ratio of the winding takes a small value of 0.866. Therefore, in the electric rotating machine, the motor torque is small, and the voltage generated by a generator is low.

(5) Further, because the ratio of the number M of the magnetic poles of the stator to the number P of the magnetic poles of the permanent magnet is set to M:P=3:2, it is impossible to dispose motor winding sets and generator winding sets on the stator magnetic poles independently of each other. Accordingly, insulation is used in common to both the winding sets, so that the safety is inferior.

It is an object of the present invention to provide a permanent-magnet electric rotating machine with a concentrated winding stator in which the foregoing problems in the conventional electric rotating machine can be solved.

SUMMARY OF THE INVENTION

In order to achieve the above object, according to an aspect of the present invention, provided is a permanent-magnet electric rotating machine with a concentrated winding stator, including a stator having a plurality of stator magnetic poles formed so as to extend radially from an annular yoke portion of a stator iron core, and windings mounted on the stator magnetic poles; and a rotor having a permanent magnet with a plurality of magnetic poles and rotatably held so as to face the stator through an air gap; wherein each of the stator magnetic poles has a straight shape having a width which is made constant over a whole length, small grooves are formed in each of the stator magnetic poles in symmetrical positions on opposite sides and near a top end portion of the stator magnetic pole, a bottom portion of each slot portion defined by adjacent ones of the stator magnetic poles and the yoke is formed triangularly, each of the stator winding is constituted so that a winding having a predetermined number of turns and winding being formed so as to be fittable to each of the stator magnetic poles is mounted on the stator magnetic pole through an insulator, and wedges are fitted to the small grooves formed in the stator magnetic poles.

According to this configuration, each of the stator magnetic poles is formed so as to have a straight shape in which the width of the magnetic pole is made constant and the slot has a bottom portion which is formed to be triangular, as mentioned above. Accordingly, the slit width between stator magnetic poles adjacent to each other is widened. Therefore, stator windings which are bobbin-wound with thick wires in advance can be mounted on the stator magnetic poles from the radial center side of the stator iron core.

Further, the slot area is increased so that it is possible to increase the total number of turns of the stator windings.

In the above permanent-magnet electric rotating machine with a concentrated winding stator, preferably, each of the stator windings includes motor windings and generator windings, the motor windings being mounted on every two of, that is, a half of the stator magnetic poles, while the generator windings are mounted in the same manner in the rest half of the stator magnetic poles.

With such a configuration, insulations for the motor windings and the generator windings are separated perfectly. Accordingly, it is possible to obtain an electric rotating machine in which the safety is improved. In addition, it is possible to reduce the number of terminals of the windings to be processed.

In the above permanent-magnet electric rotating machine with a concentrated winding stator, preferably, the number of turns of the motor windings is made different from that of the generator windings.

With such a configuration, it is possible to increase the generator output voltage taking the voltage drop due to a load in the generator output into consideration in advance.

In the above permanent-magnet electric rotating machine with a concentrated winding stator, preferably, the relationship between the number M of the stator magnetic poles and the number P of the magnetic poles of the permanent magnet is set to satisfy conditions of $(2/3)<(P/M)<(4/3)$ and $P \neq M$.

With such a combination of the numbers M and P in the conditions mentioned above, it is possible to obtain the above-mentioned winding factor expressing the effective utilization ratio of the stator windings the value of which is equal to or larger than that in the conventional case.

In the above permanent-magnet electric rotating machine with a concentrated winding stator, preferably, the relationship between the number M of the stator magnetic poles and the number P of the magnetic poles of the permanent magnet is set to satisfy a condition of $M:P=6n:(6n\pm2)$ (n being an integer not smaller than 2).

With such a ratio of the number M to the number P, the winding factor takes a large value of 0.933 in the case of n=2, 0.970 in the case of n=3 and 0.983 in the case of n=4. Accordingly, the electric rotating machine having a large motor torque, a high generator voltage, and a small cogging torque can be obtained.

BRIEF DESCRIPTION OF THE DRAWINGS

FIG. 5 is a drawing as Table 1 showing winding factors K in combination with the number M of the magnetic poles of the stator and the number P of the magnetic poles of the permanent magnet;

FIG. 17 is a drawing as Table 2 showing the relationship between the wire diameter and the number of turns of the motor winding and the generator winding;

DETAILED DESCRIPTION OF THE PREFERRED EMBODIMENT

An embodiment of a permanent-magnet electric rotating machine with a concentrated winding stator according to the present invention will be described with reference to FIG. 1.

Figure 1:
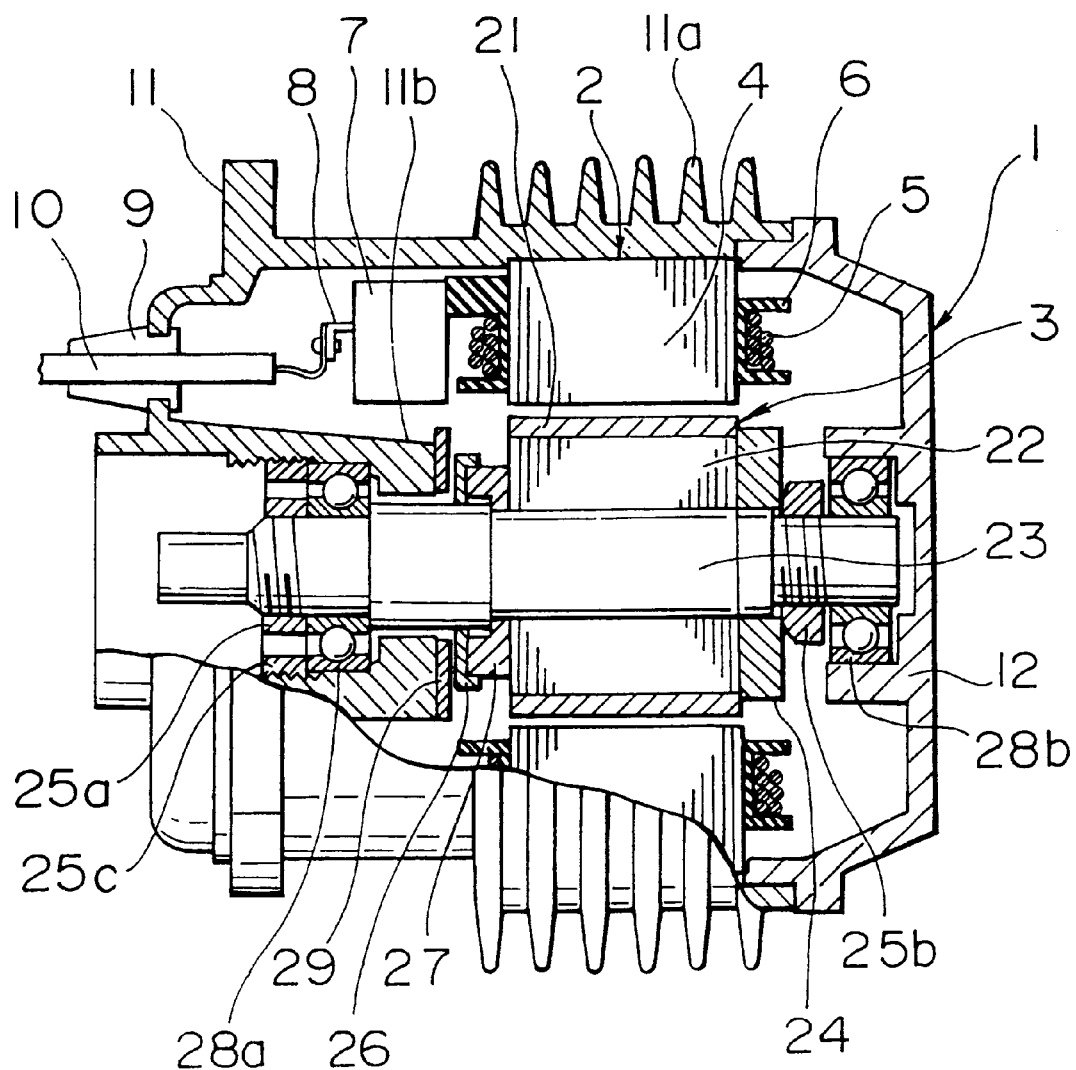
FIG. 1 is a partially cutaway longitudinally sectional view illustrating an embodiment of an electric rotating machine according to the present invention.

FIG. 1 is a partially cutaway longitudinally sectional view illustrating an embodiment of a three-phase permanent-magnet electric rotating machine of the type mentioned above according to the present invention.

In FIG. 1, a permanent-magnet electric rotating machine 1 according to the present invention is constituted by a stator 2 and a rotor 3. The stator 2 has a stator iron core 4, stator windings 5, insulators 6 for electrically insulating the stator windings 5, and a connection plate 7 for connecting terminal wires (not-shown) from the stator windings 5. A cable 10 electrically connected to an output terminal 8 of the connection plate 7 is led out through a bushing 9 fixed to a front cover 11.

In addition, the stator iron core 4 is fixed on the inner circumferential surface of the front cover 11 having heat radiation fins 11a. A rear cover 12 is fitted to the front cover 11. The front cover 11 and the rear cover 12 are disposed on the axially opposite ends, respectively, of the permanent-magnet electric rotating machine.

On the other hand, in the rotor 3, a permanent magnet 21 is fixed on a rotor iron core 22 so as to face the stator iron core 4 through a gap. The rotor iron core 22 is pressed onto a shaft 23, or fixed to the shaft 23 by a key (not-shown). A pressing plate 24 for defining the axial position of the rotor iron core 22 is fixed to axially one end of the rotor iron core 22 by means of only a nut 25b screwed to the shaft 23. In addition, a mount plate 27 to which a magnetic pole position detecting magnet 26 having the same number of magnetic poles as that of the permanent magnet 21 is fixed is disposed at the other end of the rotor iron core 22.

The magnetic pole position detecting magnet 26 is disposed at a predetermined axial air-gap distance from the end surface of the permanent magnet 21. Ball bearings 28a and 28b are provided at the opposite ends of the shaft 23, and inserted and fitted into the recess portions of the front cover 11 and the rear cover 12, respectively. The ball bearing 28a is fixed so that its inner ring is prevented from axially moving by means of a nut 25a and its outer ring is prevented from axially moving by means of a nut 25c screwed into the recess portion of the front cover.

Through an axial gap from the magnetic pole position detecting magnet 26, a board 29 having magnetic pole position detectors disposed thereon for detecting the position of the permanent magnet 21 of the rotor 3 is fixed to a top end portion 11b of the bearing support portion of the front cover 11 facing the permanent magnet 21. This magnet pole position detectors are generally constituted by Hall ICs, a Hall devices or the like, and three magnet pole position detectors are provided circumferentially separated at mechanical angles of 120 degrees.

Figure 2:
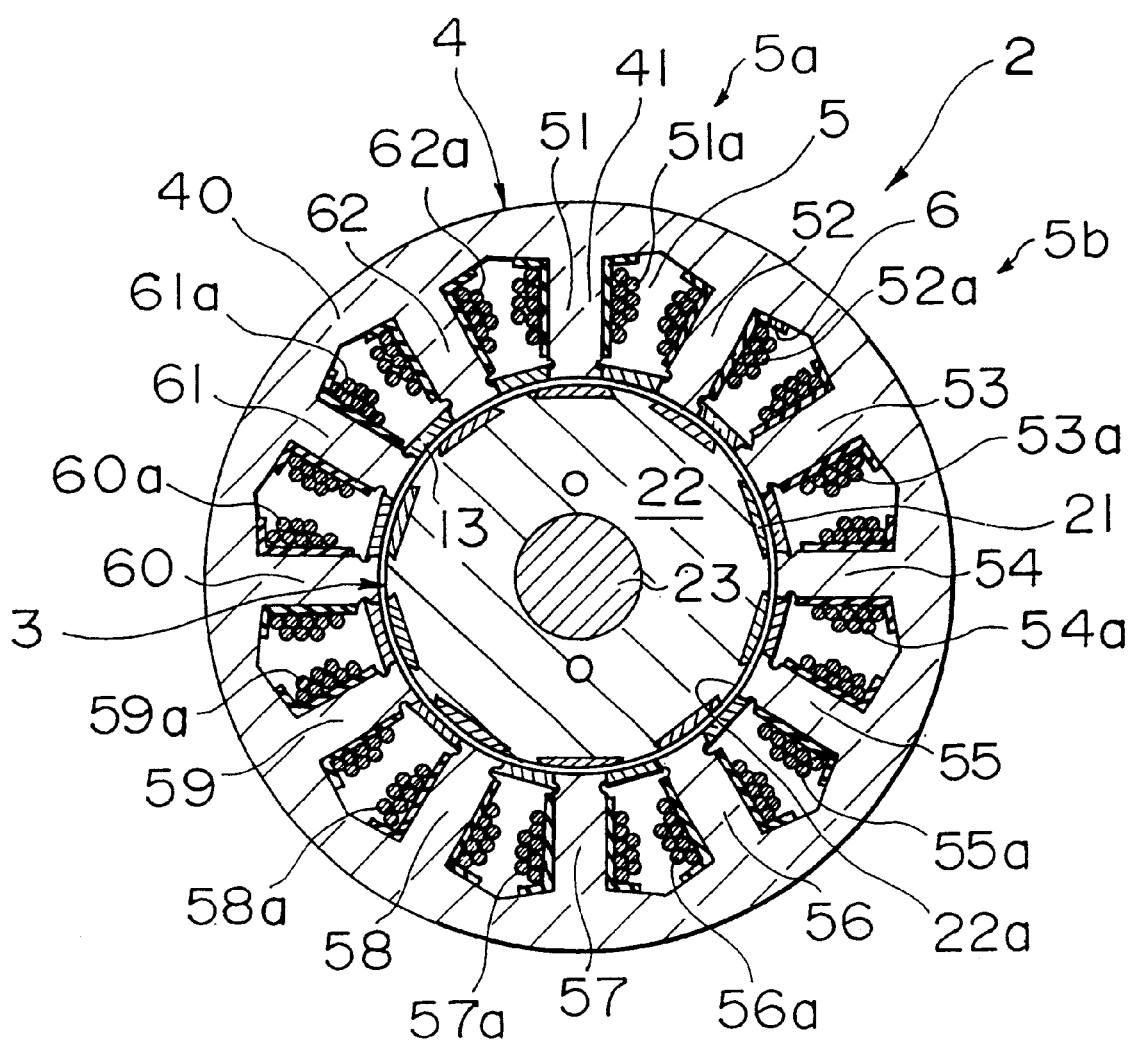
FIG. 2 is a cross-sectional view of a motor generator provided with motor windings and generator windings in the electric rotating machine according to the present invention.

Next, FIG. 2 shows a cross-sectional view of the permanent-magnet electric rotating machine 1 with a concentrated winding stator according to the present invention, in which motor windings and generator windings are provided as the stator windings 5. In addition, FIG. 3 shows a cross-sectional view of the stator iron core 4 used in the permanent-magnet electric rotating machine 1 according to the present invention.

Figure 3:
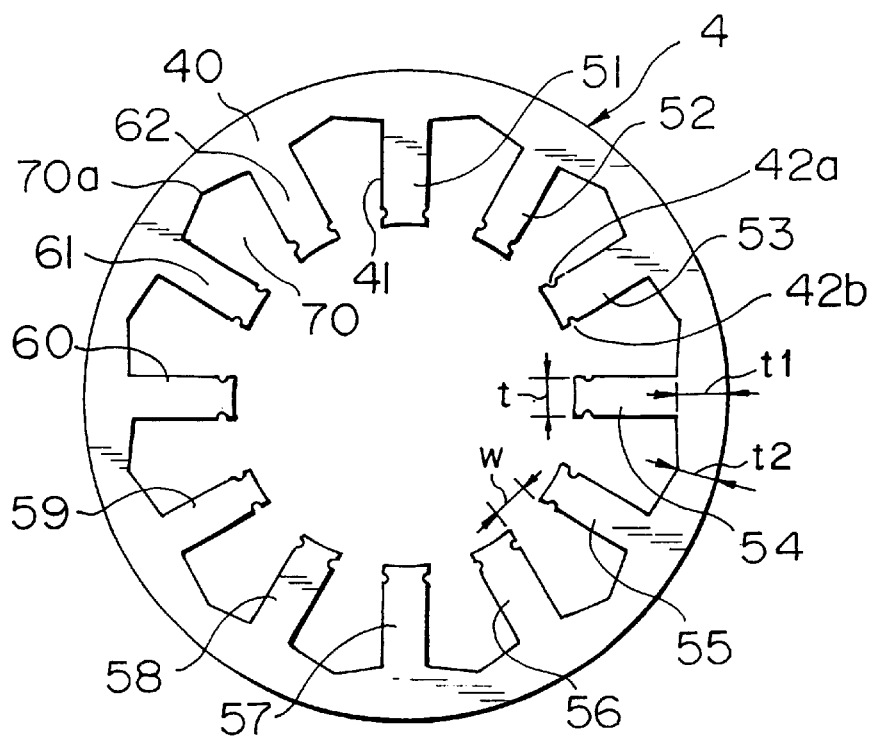
FIG. 3 is an axially sectional view of a stator iron core in the electric rotating machine according to the present invention.

In FIGS. 2 and 3, the stator 2 is constituted by the stator iron core 4, the stator winding 5, the insulators 6 for electrically insulating the stator windings 5, and wedges 13 having two functions to prevent the stator windings 5 from falling down and to electrically insulate the stator windings 5.

Further, the structure of respective parts will be described with reference to FIGS. 2 and 3.

First, the stator iron core 4 is constituted by a stator iron core yoke 40 and 12 stator magnetic poles 41 which are individually referenced by the numerals 51 to 62.

Figure 19:
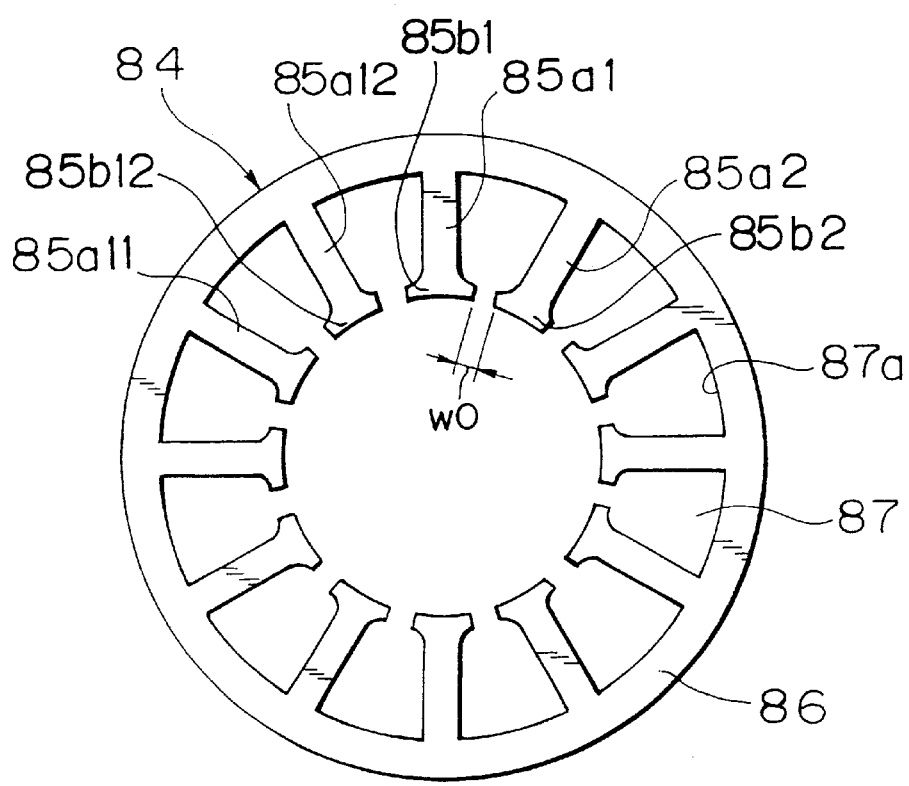
FIG. 19 is a cross-sectional view of a stator iron core in a conventional electric rotating machine.

Next, two grooves 42a and 42b are provided on the opposite sides at the inner end portion of the stator magnetic poles 41, as shown in FIG. 3. The sectional shape of each stator magnetic pole 41 is formed such that the magnetic pole thickness t is made to be constant from its inner end to its outer end on the magnetic pole so as to be straight and so that the magnetic pole has the same sectional shape from its top end to its base portion. Because of such a straight shape of each stator magnetic pole 41, slit portion size W between adjacent stator magnetic poles 41, for example, between the magnetic poles 55 and 56, can be formed to be wider than the conventional slit size W0 shown in FIG. 19.

In addition, the sectional shape of a radially outward bottom portion 70a of a slot portion 70 in which the stator winding 5 is disposed is formed not to be an arc centering the shaft center in the conventional case but formed to be a triangle connecting straight lines as shown in FIG. 3. Therefore, as for the radial thickness of the yoke 40 of the stator iron core 4, the thickness t2 of a center portion of the yoke 40 between the adjacent stator magnetic poles 41 is smaller than the thickness t1 of the yoke 40 at each stator magnetic pole 41. In such a manner, the sectional area of the slot portion 70 can be increased by forming the slot bottom portion 70a into a triangle.

The rotor 3 opposite to the stator iron core 4 through an air gap is constituted by 10 magnetic poles (or 14 magnetic poles) of the permanent magnet 21 and the rotor iron core 22 constituted by a stack of thin iron plates, as shown in FIG. 2. In either case where the number of magnetic poles of the permanent magnet 21 is 10 or 14, the same winding factor is taken when the number of the stator magnetic poles is 12, as shown in Table 1 of FIG. 5 which will be described later.

Each permanent magnet 21 is disposed in opposition to the stator iron core 4 through a small gap directly without providing any reinforcing ring in the outer circumferential portion of the permanent magnet 21.

In addition, each permanent magnet 21 shaped into a trapezoid is inserted into an inverted-trapezoidal groove formed in the rotor iron core 22, and fixed by a bonding agent or the like.

The sectional shape of each permanent magnet 21 may be formed so that its upper surface opposite to the stator iron core 4 through a gap as shown in FIG. 2 is shaped into an arc, while the lower surface contacting with the rotor iron core 22 is made flat, and the opposite side surfaces are tapered. In such a case, there are features that the magnetic flux distribution in the gap can be made approximate to a sine wave, the adhesion of each permanent magnet 21 to the rotor iron core 22 can be made firm, and each permanent magnet 21 can be manufactured at a low price.

The number M of the magnetic poles of the stator and the number P of the magnetic poles of the permanent magnet according to the present invention can be combined variously. When the combination of the numbers M and P is selected, the relationship between the combination of M and P and the winding factor can be calculated so as to satisfy the condition $(2/3)<(P/M)<(4/3)$ and $P \neq M$, as expressed in Table 1 shown in FIG. 5. It is understood from Table 1 that the winding factor in any combination of M and P takes 0.866 or more.

Therefore, the value of the winding factor herein is equal to or higher than that of the combination of M and P in a conventional electric rotating machine because the winding factor K herein is 0.866 as mentioned above in the conventional electric rotating machine with a concentrated winding stator in which the ratio of M to P is 3:2.

Particularly, the combination with the affix * in the column of "the number P of magnetic poles of permanent magnet" takes the maximum value as the winding factor K.

The relationship of these combinations between the number M of the magnetic poles of the stator and the number P of the magnetic poles of the permanent magnet taking the maximum value as the winding factor K is expressed by:

M:P=6n:(6n±2) Providing n is an integer of 2 or more.

In addition, the combination of M and P with the affix # in the column of "the number P of magnetic poles of permanent magnet" takes the largest value as the winding factor K next to the above-mentioned combination taking the maximum value.

On the basis of the above discussion, in the embodiment of the present invention which will be described below, one combination in Table 1 in which the number M of the magnetic poles of the stator is 12 while the number P of the magnetic poles of the permanent magnet is 14 is adopted by way of example, and the configuration with the combination will be described hereunder.

Figure 4:
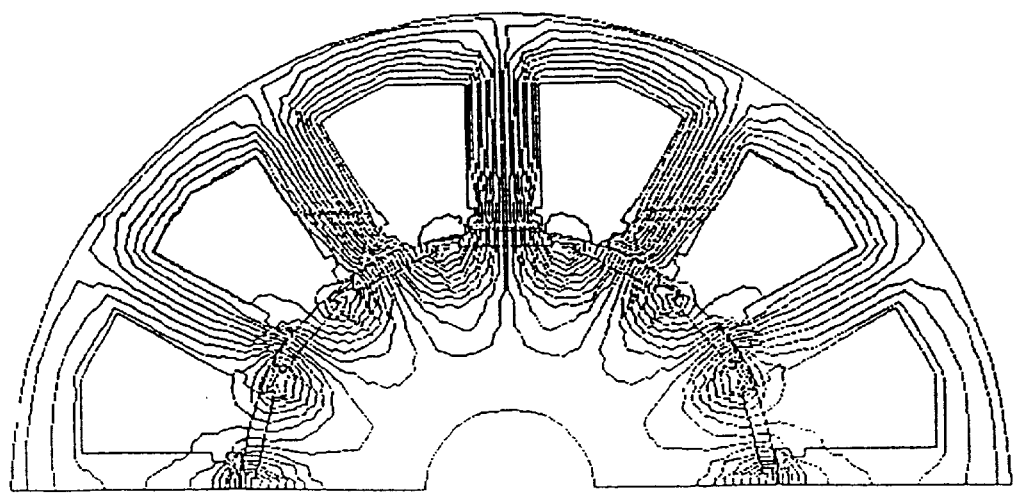
FIG. 4 is a half sectional view of the magnetic flux distribution based on magnetic field analysis of stator magnetic poles and a permanent-magnetic rotor in the electric rotating machine according to the present invention.

FIG. 4 shows a half sectional view of magnetic flux distribution based on magnetic field analysis in the case of 12 stator magnetic poles 41 and 14 magnetic poles of permanent magnet 21 used in the embodiment of the permanent-magnet electric rotating machine 1 with a concentrated winding stator according to the present invention. Although the case where the permanent magnet 21 has 10 magnetic poles is shown in FIG. 2 for convenience of illustration, as is understood from the magnetic flux distribution view of FIG. 4 in comparison with FIG. 2, magnetic flux passes through an air gap from the stator magnetic pole 51, and passes through the magnetic pole of a permanent magnet 21 and the rotor iron core 22, and thereafter further passes through the magnetic pole of another permanent magnet 21 and an air gap successively, and divided into two portions which enter the stator magnetic poles 52 and 62, and then return to the stator magnetic pole 51.

Therefore, the magnetic flux has a linkage to the stator winding 5 when the stator winding 5 is mounted on the stator magnetic pole 57 in the position opposite to and shifted by 180 degrees from the stator magnetic pole 51. Thus, one phase of winding of a three-phase motor/generator can be formed.

In this case, the winding factor takes a large value, 0.933.

It is also understood from the magnetic flux distribution view shown in FIG. 4 that there is much effective magnetic flux because the stator magnetic poles 41 are disposed in opposition to magnetic poles of the permanent magnet 21 directly through an air gap without any magnetic interposition so that there is little leakage magnetic flux between adjacent magnetic poles of the permanent magnet 21.

Returning to FIG. 2, the arrangement of the stator windings 5 as another feature of the present invention will be described. The stator windings 5 are constituted by 6 stator windings 5a for a motor and 6 stator windings 5b for a generator.

The motor stator windings 5a are mounted on every two of the stator magnetic poles 41, that is, on the magnetic poles 51, 53, 55, 57, 59 and 61, as shown in FIG. 2. On the other hand, the generator stator windings 5b are mounted on the rest of the stator magnetic poles 41, that is, the magnetic poles 52, 54, 56, 58, 60 and 62.

In FIG. 2, therefore, the motor stator windings 5a are individually referenced by 51a, 53a, 55a, 57a, 59a and 61a, while the generator stator windings 5b are individually referenced by 52a, 54a, 56a, 58a, 60a and 62a.

Figure 6:
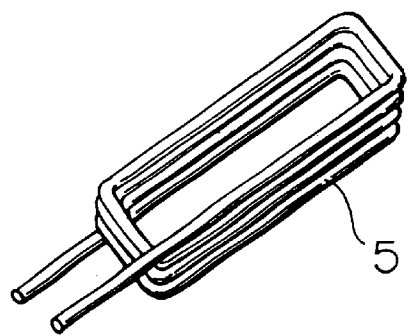
FIG. 6 is a perspective view of a bobbin-wound winding in the electric rotating machine according to the present invention.

The respective motor stator windings 5a and generator stator windings 5b are bobbin-wound in advance by use of a winding jig as shown in FIG. 6, and two terminals of the start and end of each winding are led out.

Figure 7:
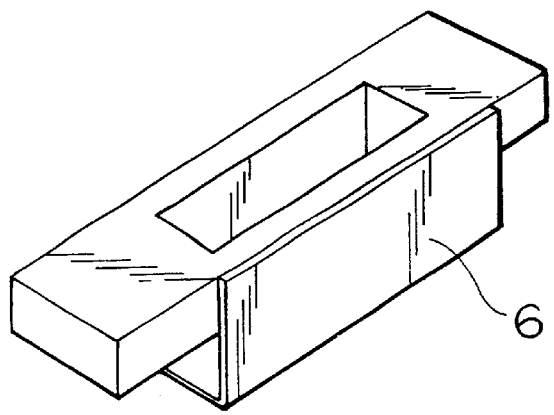
FIG. 7 is a perspective view of an insulator inserted to a stator magnetic pole in the electric rotating machine according to the present invention.

FIG. 7 shows a perspective view of an L-shaped insulator 6 of an insulating material attached to each stator magnetic pole 41. Such an insulator 6 having a rectangular hole as shown in FIG. 7 is inserted onto each stator magnetic pole 41 shown in FIG. 2 so as to enclose the stator magnetic pole 41. Further, the motor stator windings 5a and the generator stator windings 5b are inserted onto the predetermined stator magnetic poles 41 through the insulators 6 respectively. FIG. 2 shows a state after insertion of the insulators 6 onto the stator magnetic poles 41 respectively.

Figure 8:
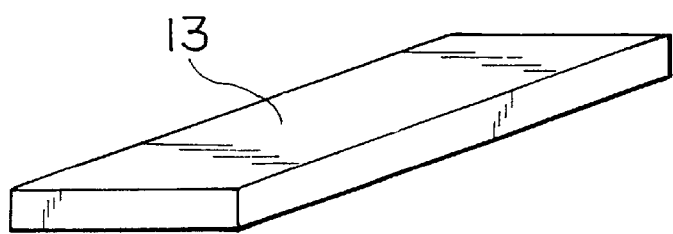
FIG. 8 is a perspective view of a wedge to be inserted into grooves of stator magnetic poles in the electric rotating machine according to the present invention.

After the stator windings 5 are inserted, thin-plate wedges 13 of insulating material as shown in FIG. 8 are axially inserted into the groove portions 42 of the stator magnetic poles 41 respectively. The thin-plate wedges 13 are used for electrically insulating the stator windings 5 and for preventing the windings from falling down.

After the wedges 13 are inserted, the stator windings 5 are fixed by varnish or mold material.

Figure 9:
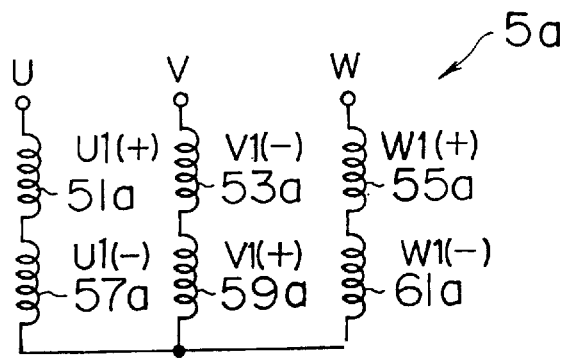
FIG. 9 is a series-connection diagram of motor stator windings in the electric rotating machine according to the present invention.

FIG. 9 shows a connection diagram of the motor stator windings 5a.

The motor stator windings 5a are formed for three phases of U, V and W in a three-phase permanent-magnetic motor.

As for the U-phase, a terminal U1(+) of the stator winding 51a mounted on the magnetic pole 51 of the stator magnetic poles 41 (hereinafter referred to as "stator magnetic pole 51", this applies to other magnetic poles), and a terminal U1(−) of the stator winding 57a of the stator winding 5a (hereinafter referred to as "stator winding 57a", and this applies to other magnetic poles) mounted on the stator magnetic pole 57 disposed in opposition to and shifted by 180 degrees from the stator magnetic pole 51 are connected in series so as to form a U-phase.

Next, as for the V-phase, a terminal V1(−) of the stator winding 53a mounted on the stator magnetic pole 53 and a terminal V1(+) of the stator winding 59a mounted on the stator magnetic pole 59 which is in opposition to and shifted by 180 degrees from the state magnetic pole 53 are connected in series so as to form a V-phase.

In the same manner, as for the W-phase, a terminal W1(+) of the stator winding 55a mounted on the stator magnetic pole 55 and a terminal W1(−) of the stator winding 61a mounted on the stator magnetic pole 61 which is in opposition to and shifted by 180 degrees from the stator magnetic pole 55 are connected in series so as to form a W-phase.

The winding end terminals of the stator windings 57a, 59a and 61a of the U-, V- and W-phases are connected to form a neutral points.

The marks (+) and (−) designate winding directions of the winding. For example, the mark (+) designates clockwise winding, while the mark (−) designates counterclockwise winding.

Figure 10:
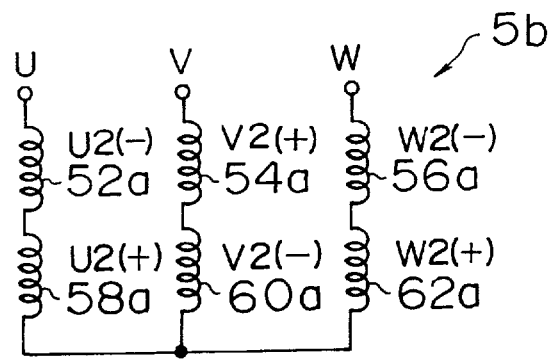
FIG. 10 is a series-connection diagram of generator stator windings in the electric rotating machine according to the present invention.

FIG. 10 shows a connection diagram of the generator stator windings 5b.

The generator stator windings 5b are constituted by three phases of U, V and W in a three-phase permanent-magnetic generator.

As for the U-phase, a terminal U2(−) of the stator winding 52a mounted on the stator magnetic pole 52 and a terminal U2(+) of the stator winding 58a mounted on the stator magnetic pole 58 which is in opposition to and shifted by 180 degrees from the stator magnetic poles 52 are connected in series so as to form a U-phase.

Next, as for the V-phase, a terminal V2(+) of the stator winding 54a mounted on the stator magnetic pole 54 and a terminal V2(−) of the stator winding 60a mounted on the stator magnetic pole 60 which is in opposition to and shifted by 180 degrees from the stator magnetic pole 54 are connected in series so as to form a V-phase.

In the same manner, as for the W-phase, a terminal W2(−) of the stator winding 56a mounted on the stator magnetic pole 56 and a terminal W2(+) of the stator winding 62a mounted on the stator magnetic pole 62 which is in opposition to and shifted by 180 degrees from the stator magnetic pole 56 are connected in series so as to form a W-phase.

The winding end terminals of the stator windings 58a, 60a and 62a of the respective U-, V- and W-phases are connected to form a neutral point.

In the same manner as those in the motor windings 5a, the marks (+) and (−) designate winding directions of the windings. For example, the mark (+) designates clockwise winding, while the mark (−) designates counterclockwise winding.

In such a manner, in the permanent-magnet electric rotating machine 1 with a concentrated winding stator according to the present invention, the motor stator windings 5a and the generator stator windings 5b are mounted on different stator magnetic poles 41 respectively each mounted on every two poles. Accordingly, the motor stator windings are separated perfectly from the generator stator windings with respect to insulation.

The number of turns N1 of the motor stator windings 5a may be equal to the number of turns N2 of the generator stator windings 5b. Alternatively, the numbers N1 and N2 may be set to satisfy N1<N2 so as to increase the generated voltage taking the voltage drop in the generator output caused by a load into consideration in advance.

Although, in the permanent-magnet electric rotating machine 1 with a concentrated winding stator according to the present invention, the aforementioned embodiment is described about the case where the number M of the magnetic poles of a stator is 12 while the number P of the magnetic poles of permanent magnet is 14, the same winding factor 0.933 can be obtained also when M=12 and P=10 so that the condition of M:P=6n:(6n±2) is satisfied, where n is an integer of 2 or more.

The stator windings 51a and 57a constituting the U-phase of the motor stator windings 5a are bobbin-wound clockwise and counterclockwise respectively, and the winding end of the stator winding 51a and the winding start of the stator winding 57a are connected to each other to form the U-phase of the phases U1(+) and U1(−). However, when the stator windings 51a and 57a are bobbin-wound in the same direction (for example, clockwise) and the respective winding ends of the stator windings 51a and 57a are connected to each other, the phases U1(+) and U1(−) can be obtained. Similarly, as for the V- and W-phases of the motor stator windings 5a and the U-, V- and W-phases of the generator stator windings 5b, necessary phases of the stator windings 5 can be obtained in the same manner.

Although each of the stator magnetic pole 41 is shaped straight so that its magnetic pole width is constant over the whole length as mentioned above, it may be tapered, instead, so that the magnetic pole width is made large on the yoke 40 side of the stator core while it is made smaller as a position goes toward the inner top side. In this case, the slit width between adjacent stator magnetic poles is increased, so that the bobbin-wound windings 5 can be mounted onto the magnetic poles 41 smoothly.

In addition, in the permanent-magnet electric rotating machine with a concentrated winding stator according to the present invention described in the above embodiment, the motor stator windings 5a are mounted on every two poles, that is, on half of M stator magnetic poles 41, while the generator stator windings 5b are similarly mounted on the rest half to thereby constitute a motor and a generator.

To form an electric rotating machine as an independent motor with a concentrated winding stator, it will go well if the motor stator windings 5a are mounted on every two poles, that is, on half of M stator magnetic poles 41, while other motor stator windings 5a are similarly mounted on the rest half.

In the same manner, an electric rotating machine and an independent generator with a concentrated winding stator can be formed if the generator stator windings 5b are mounted on every two poles, that is, on half of M stator magnetic poles 41, while other generator stator windings 5b are similarly mounted on the rest half.

Then, the number of turns of the motor windings 5a and that of the generator windings 5b are made twice as large as that in the former case.

Figure 11:
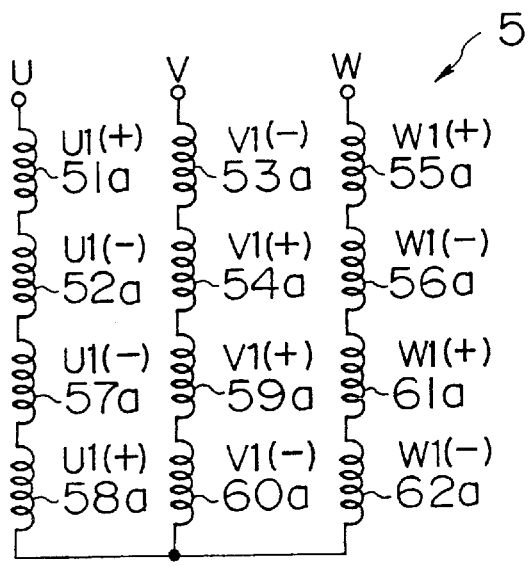
FIG. 11 is a series-connection diagram showing another embodiment of stator windings in the electric rotating machine according to the present invention.

As shown in the winding connection diagram of FIG. 11, 12 stator windings 5 formed by thick-wire bobbin-wound in advance are inserted/mounted on all the 12 stator magnetic poles 41. The U-phase is formed by the four terminals, that is, U1(+) of the stator winding 51a, U1(−) of the stator winding 52a, U1(−) of the stator winding 57a and U1(+) of the stator winding 58a; the V-phase is formed by the four terminals, that is, V1(−) of the stator winding 53a, V1(+) of the stator winding 54a, V1(+) of the stator winding 59a, and V1(−) of the stator winding 60a; and the W-phase is formed by the four terminals, that is, W1(+) of the stator winding 55a, W1(−) of the stator winding 56a, W1(+) of the stator winding 61a and W1(−) of the stator winding 62a. If each phase is formed by a series connection, it is possible to obtain an electric rotating machine with a concentrated winding stator which functions as an independent motor or an independent generator, in the same manner as described above.

FIGS. 9 to 11 show winding connection diagrams of the electric rotating machine with a concentrated stator windings according to the present invention, in which the windings 5 in each phase are connected in series when all the windings are formed as the motor windings 5a or as the generator windings 5b for constituting independently a motor of a generator. However, the windings 5 in each phase may be connected in parallel.

Figure 12:
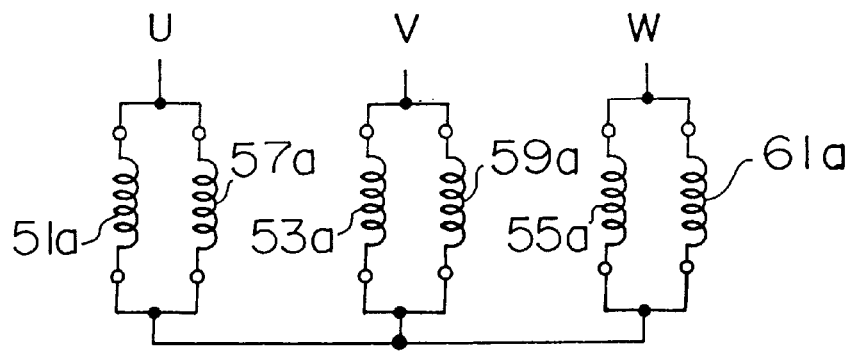
FIG. 12 is a parallel-connection diagram of motor stator windings in the electric rotating machine according to the present invention.
Figure 13:
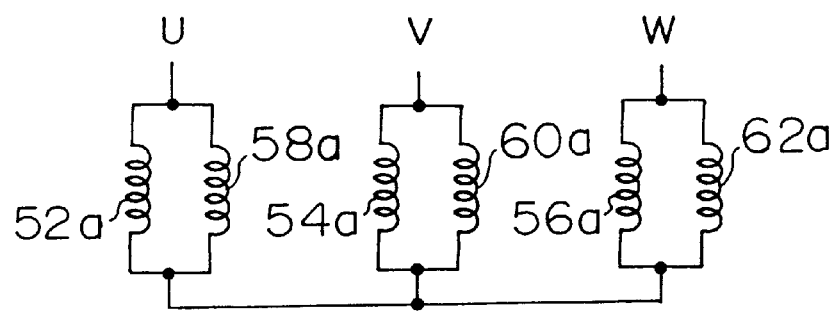
FIG. 13 is a parallel-connection diagram of generator stator windings in the electric rotating machine according to the present invention.
Figure 14:
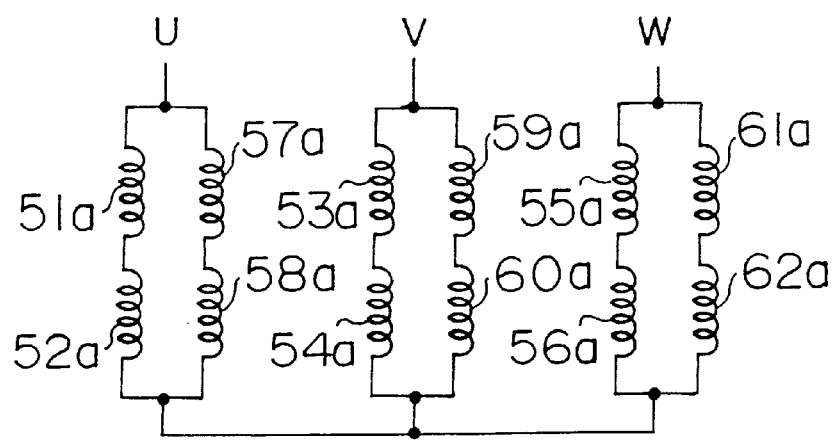
FIG. 14 is a connection diagram wherein stator windings of an independent machine for a motor and stator windings of an independent machine for a generator in the electric rotating machine according to the present invention are connected in series and in parallel to each other so as to form windings for respective phases.

That is, FIG. 12 shows a connection diagram in which as the stator windings 5 used in a permanent-magnet electric rotating machine according to the present invention, the motor windings 5a are connected in parallel to form the respective phases. FIG. 13 shows a connection diagram in which as the stator windings 5 used in an electric rotating machine according to the present invention, the generator windings 5b are connected in parallel to form the respective phases. FIG. 14 shows a connection diagram in which the windings 5 connected in series are further connected in parallel to form each phase to constitute an independent motor with the motor windings 5a or an independent generator with the generator windings 5b.

Alternatively, the windings 5 connected in parallel may be further connected in series to form each phase.

In the case of parallel connection, it is necessary to make the windings 5a or 5b equal in the number of turns to each other. As for the connection examples shown in FIGS. 9 to 11, 12 to 14, examples of the relationship between the wire diameter and the number of turns of each winding of the motor windings 5a and the generator windings 5b are shown in Table 2 of FIG. 17. In Table 2, $\phi D1$ and $\phi D2$ have the relationship expressed by the following equation (1), and $\phi D2$ and $\phi D3$ have the relationship expressed by the following equation (2).

sectional area of $\phi D2$=(sectional area of $\phi D1$)/2... (1)

sectional area of $\phi D3$=(sectional area of $\phi D2$)/2... (2)

Figure 15:
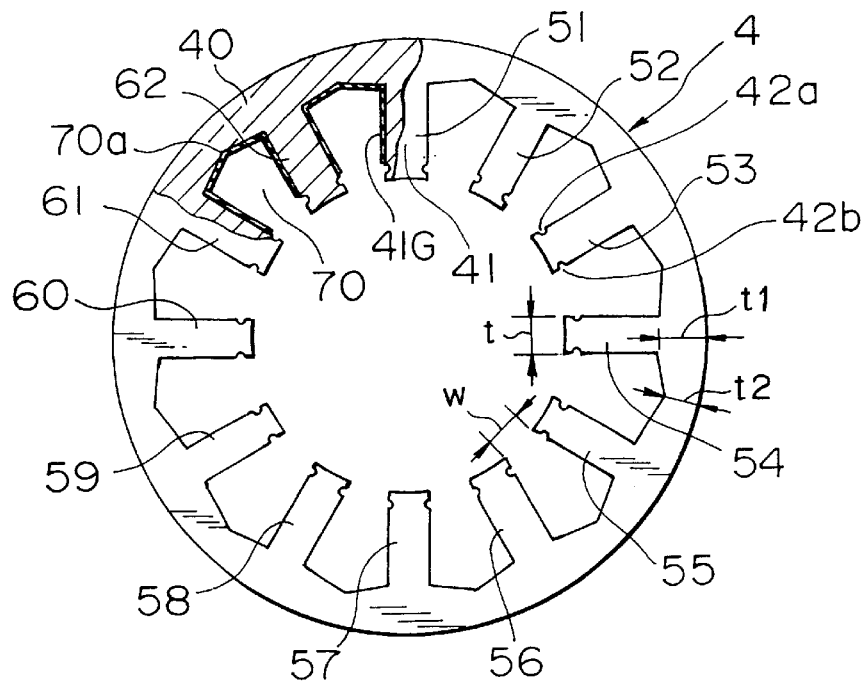
FIG. 15 is a cross-sectional view showing a state in which a coating of synthetic resin or the like is made adhered to each of magnetic poles of a stator iron core in the electric rotating machine according to the present invention.

In the structure of the stator 2 shown in FIG. 2, the insulators 6 are attached to the magnetic poles 41 of the stator iron core 4, and the stator windings 5 are mounted on the magnetic poles 41 through these insulators 6 respectively. However, the magnetic poles 41 of the stator iron core 4 may be provided with such an insulating structure 41G that the inner circumferential surfaces of the magnetic poles 41 are coated with synthetic resin or the like as shown in FIG. 15. Thus, the insulators 6 may be replaced by this insulating structure 41G. Accordingly, in the permanent-magnet electric rotating machine with a concentrated winding stator according to the present invention, it can be also considered that the insulators 6 are omitted in the magnetic poles 41 of the stator iron core 4.

The thin-plate wedge 13 of insulating material as shown in FIG. 8 may be replaced by a magnetic wedge in which not insulating material as mentioned above but, for example, a mixture of synthetic resin and iron powder with a larger magnetic permeability than the air is heated and pressurized so as to be formed into a laminated plate. In this case, it is possible to reduce eddy-current loss generated in the permanent magnet caused by dropping down of the magnetic flux density in the stator magnetic pole grooves 42a and 42b. It is therefore possible to reduce the temperature rising in the rotor 3, improve the efficiency of the electric rotating machine 1, and reduce vibrations or noise.

Figure 18:
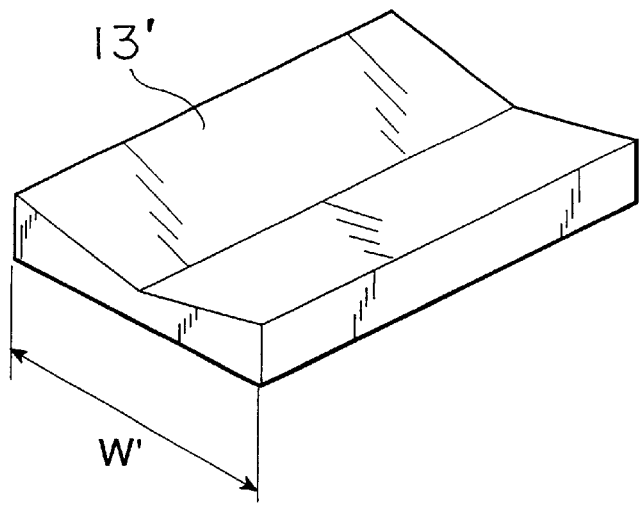
FIG. 18 is a perspective view of a wedge in another embodiment, to be inserted into grooves of stator magnetic poles in the electric rotating machine according to the present invention.

On the other hand, if the magnetic wedge is shaped not like such a thin plate as shown in FIG. 8 but like a V-block the thickness of which is reduced substantially in the center portion of width W' as shown as a magnetic wedge 13' in FIG. 18, it is possible to reduce the magnetic flux leaking between adjacent stator magnetic poles 41.

Figure 16:
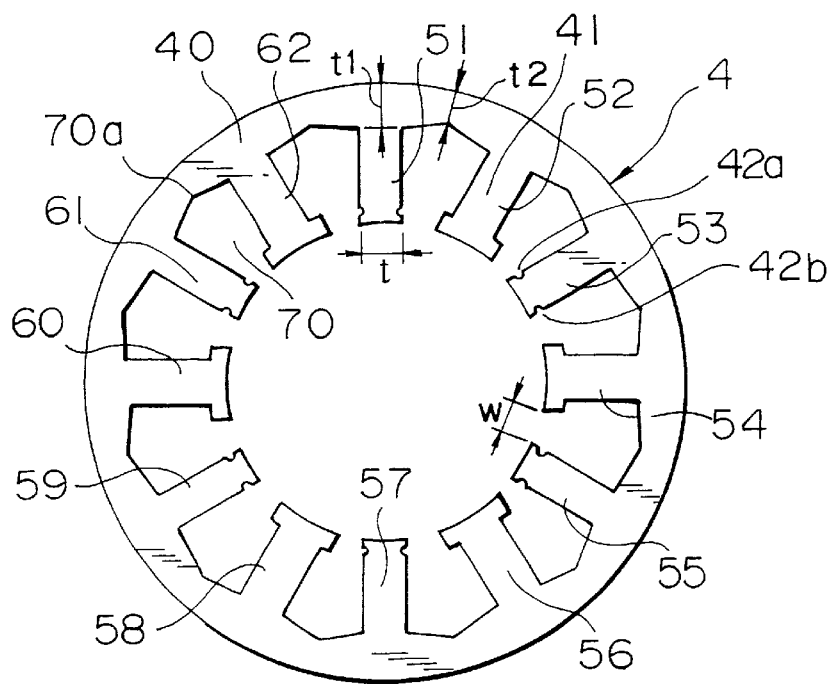
FIG. 16 is a cross-sectional view of a stator iron core in which a magnetic pole shaped straight and a magnetic pole provided with a pole shoe on its top end are disposed alternately in the electric rotating machine according to the present invention.

The shape of the stator iron core 4 shown in FIG. 3 may be modified such that a magnetic pole having the straight shape in which the magnetic pole width is constant from its top end to its root and a magnetic pole having a pall shoe on its top end are disposed alternately as shown in FIG. 16. In this case, windings 5 shaped in advance may be mounted on the straight magnetic poles while other windings may be mounted on the pall-shoed magnetic poles by means of a nozzle of a winding machine.

The thus configured permanent-magnet electric rotating machine with a concentrated winding stator according to the present invention has superior effects as follows.

(1) In the electric rotating machine according to the present invention, the slit width between adjacent stator magnetic poles is large so that stator windings bobbin-wound with thick wires in advance can be inserted onto stator magnetic poles from the radial center side of a stator iron core. Accordingly, the resistance of the windings can be reduced, so that it is possible to obtain an electric rotating machine having high power and low loss.

(2) Because a slot bottom portion is shaped to be triangular, the slot area increases so that the number of turns of the stator windings can be increased. Accordingly, it is possible to obtain a large motor torque and a high generator voltage.

(3) Because the ratio of the number M of the magnetic poles of a stator to the number P of the magnetic poles of the permanent magnet is set to M:P=6n:(6n±2), the winding factor increases to 0.933. Here, n is an integer of 2 or more. Accordingly, it is possible to obtain a large motor torque and a high generator voltage. In addition, it is possible to obtain an electric rotating machine having a small cogging torque.

(4) Because motor stator windings are mounted on a half of the number M (that is, M/2) of magnetic poles of the stator and generator stator windings are mounted on the rest half, the former windings are separated perfectly with respect to insulation from the latter windings. Accordingly, the safety is improved. In addition, because the number of terminals to be processed is reduced, it is possible to reduce the time taken for connection of the terminals to a connection plate.

(5) Because the stator iron core and the permanent magnet are disposed in opposition to each other directly through an air gap, the leakage magnetic flux from the permanent magnet is reduced. It is therefore possible to increase the effective magnetic flux, obtain a large motor torque, and reduce inductance.

(6) The number of turns of the windings can be made different between the motor windings and the generator windings, so that it is possible to increase the generator voltage in advance taking the voltage drop of the generator output caused by a load into consideration.

What is claimed is:

1. A permanent-magnet electric rotating machine with a concentrated winding stator comprising:

a stator having a plurality of stator magnetic poles formed so as to extend radially from an annular yoke portion of a stator iron core, and windings mounted on said stator magnetic poles; and a rotor having permanent magnets with a plurality of magnetic poles and rotatably held so as to face said stator through an air gap, with each of the permanent magnets having a cross sectional shape that includes an upper surface adjacent to the air gap shaped as an arc along a rotor rotation direction, a bottom surface furthest from the air gap and in contact with a rotor core that is flat, and two opposite side surfaces that extend from the upper surface to the bottom surface in a tapered fashion that results in the two opposite sides being further apart at the bottom surface than at the top surface;

wherein each of said stator magnetic poles has a straight shape having a width which is made constant over a whole length, small grooves are formed in each of said stator magnetic poles in symmetrical positions on opposite sides and near a top end portion of said stator magnetic pole, said small grooves for supporting wedges are not formed on top end surfaces of said stator magnetic poles facing said air gap but in side surfaces of said stator magnetic poles in a vicinity of said top end surfaces but which do not face said air gap, a bottom portion of each slot portion defined by adjacent ones of said stator magnetic poles and said yoke is formed triangularly, each of said stator winding is constituted so that a winding having a predetermined number of turns and winding being formed so as to be fittable to each of said stator magnetic poles is mounted on said stator magnetic pole through an insulator, and magnetic wedges that are fitted to said small grooves formed in said stator magnetic poles.

2. The machine according to claim 1, wherein said stator windings include motor windings and generator windings, said motor windings are mounted on every other of said stator magnetic poles, while said generator windings are mounted therebetween.

3. The machine according to claim 2, wherein a number of turns of said motor windings is smaller than a number of turns of said generator windings.

4. The machine according to any one of claims 2 to 3, wherein a relationship between a number M of said stator magnetic poles and a number P of said magnetic poles of said permanent magnets are set to satisfy a condition of:

M:P=6n:(6n±2), wherein n is an integer not smaller than 2.

5. The machine according to claim 1, wherein a relationship between a number M of said stator magnetic poles and a number P of said magnetic poles of said permanent magnets are set to satisfy conditions of:

(2/3)<(P/M)<(4/3), and wherein P≠M.

6. The machine according to claim 1, wherein said wedges are formed from one of an insulating material and a material having a magnetic permeability greater than that of air.

7. The machine according to claim 6, wherein said wedges are formed from said material having a magnetic permeability greater than that of air and comprising a mixture of synthetic resin and iron powder.

8. The machine according to claim 1, wherein said wedges are formed having a cross section in the shape of a V with a thickness reduced substantially in a center portion.

* * * * *